Patented Mar. 31, 1925.

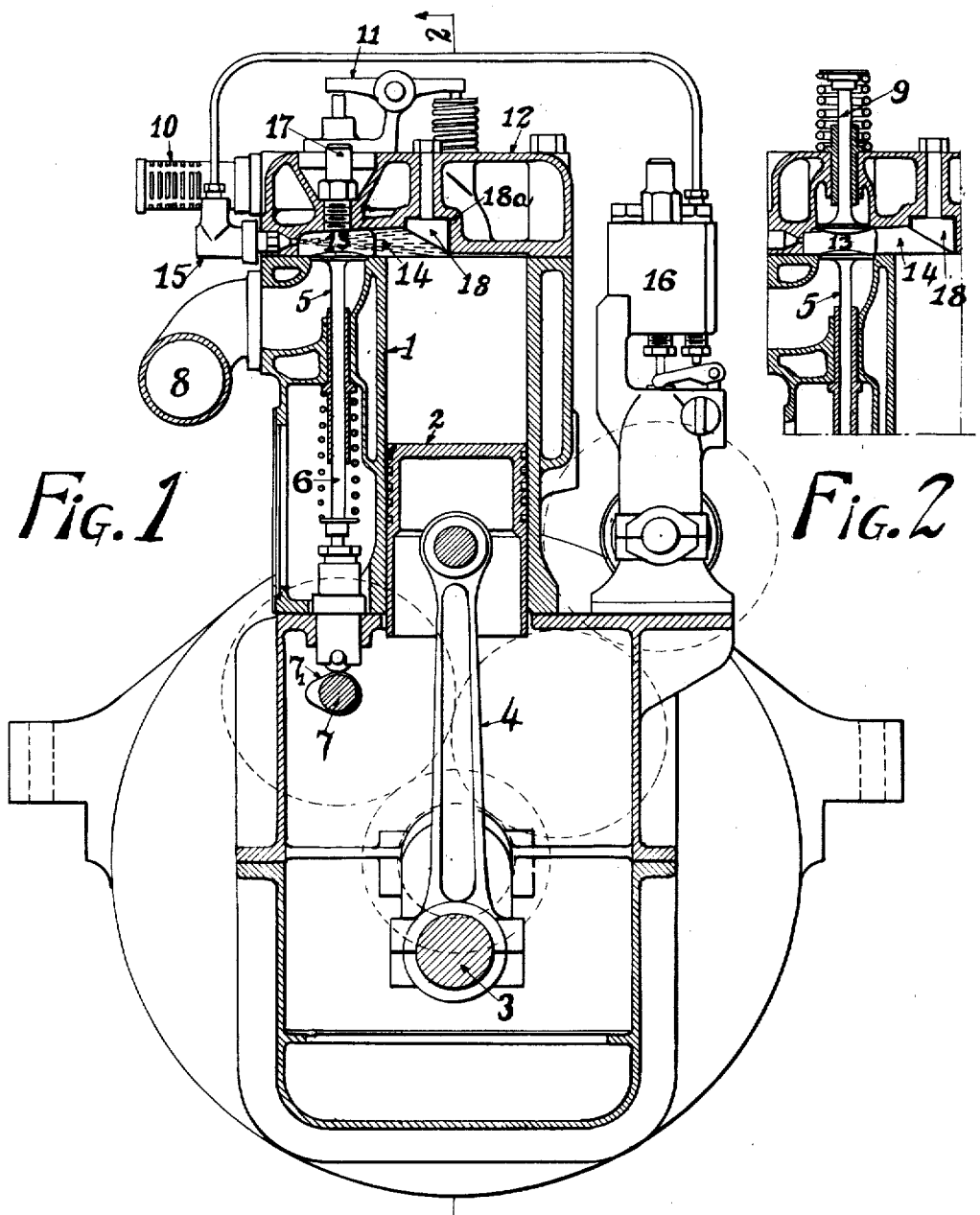

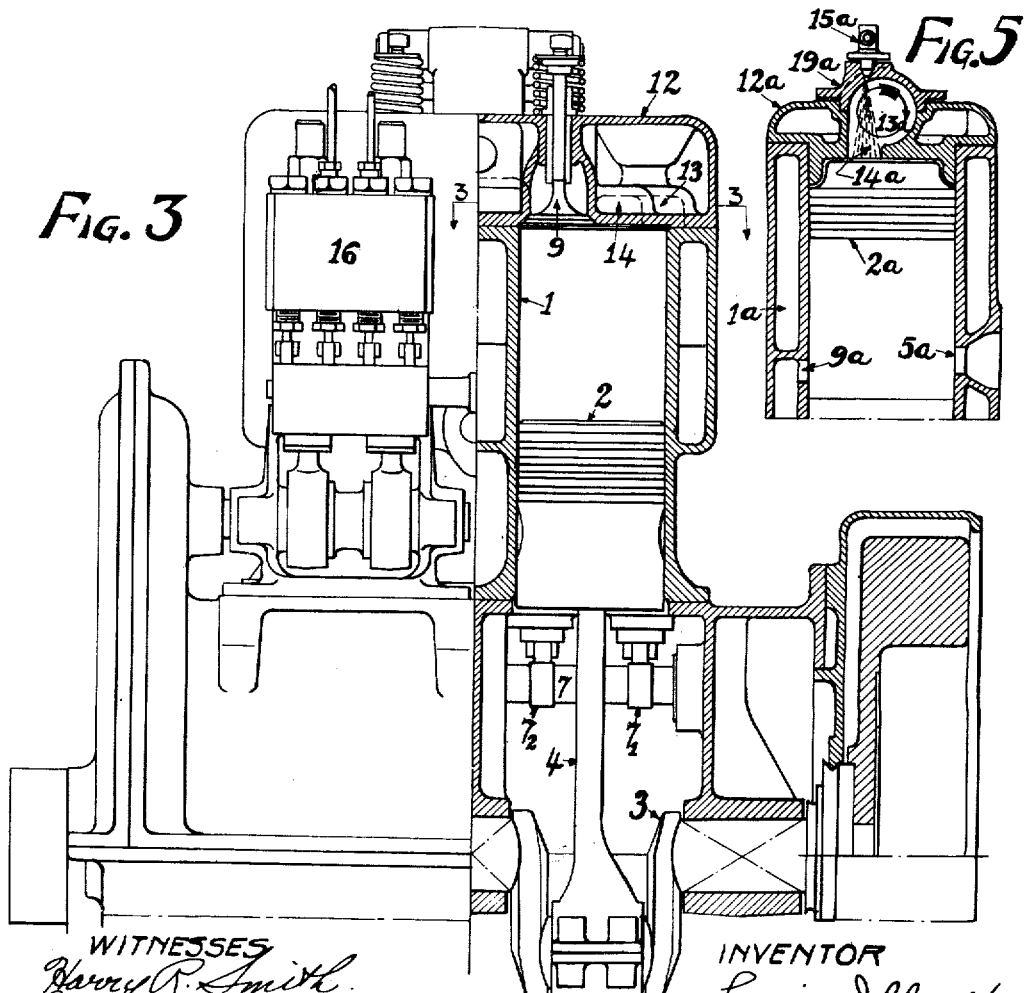

1,531,399

UNITED STATES PATENT OFFICE.

LOUIS ILLMER, OF CORTLAND, NEW YORK.

INTERNAL-COMBUSTION ENGINE.

Application filed July 19, 1921. Serial No. 485,888.

*To all whom it may concern:*

Be it known that I, LOUIS ILLMER, a citizen of the United States, and a resident of Cortland, in the county of Cortland and State of New York, have invented certain new and useful Improvements in Internal-Combustion Engines, of which the following is a specification.

My invention relates more particularly to so-called airless direct-injection fuel oil engines, and has for its object the increase of efficiency, speed, and power capacity of such semi-Diesel engines by means of improved construction of the combustion chamber, this chamber being so designed that practically all of the available air is repeatedly brought into intimate contact with the injected fuel oil by means of intense turbulence currents created by piston displacement.

I attain this end by forming the clearance space of the power cylinder into a relatively flat drum-shaped vaporizer or combustion chamber, which communicates with the cylinder bore through a tangentially disposed neck-like portion constituting the vaporizer mouth.

The piston displacement is made to force the working charge through this contracted neck-like conduit at a relatively high velocity. By entering tangentially, an intense whirl is imparted to the charge and this gives the working fluid the necessary turbulence required for rapid and efficient combustion of the fuel oil.

The spray nozzle is directed towards the vaporizer mouth and so disposed that the atomized fuel oil is injected chord-wise across the vaporizer chamber in a counter direction to the whirl of the incoming air charge so as to insure a rapid and thorough mixing of all the air with the atomized fuel oil.

The character of turbulence employed is such that the whirled air is repeatedly brought up to and passed through the nozzle zone at the time of fuel injection, which provision obviates pocketed or localized combustion of the fuel oil. When this condition is allowed to occur, the feeding of additional oil to the cylinder leads to imperfect combustion without additional power output, notwithstanding that more than sufficient air to burn such surplus oil may be lying in inaccessible or isolated portions of the cylinder clearance space.

The present invention corrects this inherent defect by bringing the major portion of available air to the support of combustion of the injected fuel oil, allows of using higher rotating speeds, and generally tends to improve the economic status of the solid injection oil-engine as a prime mover.

The present invention further embodies improvements in coordinating the required valve and spray nozzle parts with respect to the vaporizer or combustion chamber, and also comprises various other features of structure and organization, all of which will be set forth hereafter and more particularly pointed out in the appended claims.

Referring to the acompanying two (2) sheets of drawings which illustrate one of the various embodiments of my invention, wherein:—

Fig. 1 is an elevational view in section taken crosswise of the crankshaft of a twin-cylinder four-stroke engine of the single-acting type provided with my improvement.

Fig. 2 is a sectional view illustrating a modified valve detail of the engine shown in Fig. 1.

Fig. 3 is a sectional view taken lengthwise of the crankshaft on line 2—2 of Fig. 1.

Fig. 4 is a plan view, partly sectional, as taken on the line 3—3 of Fig. 3, showing a detail of the cylinder head construction.

Fig. 5 is a partial sectional view of a power cylinder, illustrating the modified form of my vaporizer chamber as applied to a two-stroke oil engine.

Fig. 6 is a plan view of the cylinder head shown in Fig. 5.

Like reference numerals refer to like parts throughout the several views of the drawings.

In the particular four-stroke type of solid-injection oil engine shown in Figs. 1 to 4, inclusive, air is sucked into the cylinder during the first stroke of the cycle in the usual manner. During the next stroke compression of the working charge takes place and as the piston approaches its inner dead-center position, the oil is injected into the combustion chamber and ignited, causing the power impulse to drive the piston forward during the third stroke, while during the fourth stroke the exhaust valve is opened to expel the burnt products from the cylinder.

The numeral 1 represents a water-jacketed twin power cylinder which is provided with the reciprocating pistons 2 driven from the crank-shaft 3 by the connecting rods 4. Each of the cylinder bores is provided with a mechanically operated exhaust valve 5, actuated through the medium of a push rod 6 from the cam shaft 7, which latter is driven in unison with the crank-shaft through a set of 1 to 2 reduction gears in the customary manner of four-stroke engines as indicated by dotted pitch lines in Fig. 1.

In the construction shown, the exhaust valve is seated in an offset portion of the L head cylinder casting and discharges into the common exhaust header 8.

As shown in Fig. 3, the cam shaft carries two cams for each power cylinder, the cam $7_1$ being used to actuate the exhaust valve 5, while the cam $7_2$ serves to actuate the intake valve 9, which latter valve is preferably of the overhead type opening directly into the top of the cylinder bore. The intake valve communicates through a passage (not shown) cored within the cylinder head with the silencer pipe 10, through which passage the required air supply is drawn from the atmosphere. The intake valve is further provided with a tappet lever 11 which allows this valve to be actuated by means of a push rod (not shown but similar to rod 6) extending down to cam $7_2$.

The twin bores of the enbloc cylinders are further provided with a common cylinder head 12 within which is formed an offset or L head type of combustion chamber 13. As is best seen from Fig. 4, this chamber is preferably made drum-shaped with flat-like ends enclosing its cylindrical side walls, which latter walls encircle the axis of the exhaust valve spindle 6.

The separate combustion chamber 13 serves as a vaporizer for the engine and by virtue of its improved construction provides a suitable clearance space into which the atomized fuel oil may be injected and made to mix with substantially all of the highly compressed air contained in the working charge. The piston is intended to work with the minimum of allowable mechanical clearance space between its crown and the flat bottom wall of the cylinder head, thus crowding as much of the working charge as possible into the vaporizer chamber prior to the time of fuel injection.

The separate combustion chamber 13 communicates with the cylinder bore through a contracted neck-like conduit or mouth 14, which is tangentially disposed with respect to the drum-shaped walls of the combustion chamber 13. This conduit may be of any suitable shape that will serve as a nozzle to impart a relatively high velocity to the working charge while it is being pressed into the chamber 13 and to cause the charge outflowing from the cylinder bore to be directed tangentially along the cylindrical walls of the combustion chamber. This nozzle action creates the necessary impetus to set up an intense whirl to the working charge in the direction indicated by the arrow and provides for the turbulence required to bring substantially all of the available vaporizer air within the atomizing zone of the spray nozzle.

It may be further pointed out that as shown in Fig. 4, the axis of the contracted neck portion 14 of the combustion chamber 13 is offset from that of the power cylinder bore, and as will be explained hereinafter, the purpose of this feature is to aid the ignited oil-gas mixture in picking up the major portion of air lying in the unavoidable clearance space above the power piston.

The spray nozzle 15 is preferably of the usual spiral-tit solid-injection type and is intended to be supplied with properly timed and measured high-pressure oil by means of the airless direct-injection fuel pump 16. The fuel pump may be of any suitable type capable of properly atomizing and regulating the injected fuel oil, but for best results an impulsion pump similar to that more fully described in my copending Patent Application No. 229,556 filed April 19, 1918, is preferred.

A pump of this kind may be driven at half engine speed by means of a 2 to 1 reduction gear as indicated in Fig. 1 by dotted pitch lines. Owing to its impulsion plunger drive, such a pump even when running at a moderate piston speed is still capable of injecting the fuel oil into the power cylinder of a high speed engine within the very short time allowed for the combustion period.

Solid injection nozzles when working for fine atomization, lack driving force sufficient to penetrate far into the highly compressed working charge. With this class of nozzles, I have obtained best results when the air for combustion is repeatedly brought up into the nozzle zone by means of the described turbulence whirl currents rather than by attempting to spread the finely atomized fuel into all parts of the combustion chamber.

The distribution of the fuel oil throughout the air charge is best facilitated by means of a steady turbulence current flowing in some definite direction as is the case in the described whirl action, since this is only slightly impeded by eddy currents. This method allows a mass movement of the working charge to be effectively set up in one general direction which is easily maintained during the time of fuel injection, and requires the minimum of velocity through the contracted vaporizer neck to effect the desired results.

As shown in Fig. 4, the spray nozzle 15 is preferably offset from the axis of chamber 13 to align with the axis of the contracted neck 14 and made to inject from the far side of the drum shaped vaporizer chamber toward the cylinder bore. This disposition of the injection nozzle gives the spray a relatively long spread path and serves to direct the atomized oil counter to the whirling movement imparted to the air charge within the combustion chamber. By directing the nozzle into the open conduit neck, the heavier particles in the fuel spray are thereby projected against the hot piston crown where they are readily vaporized and burned efficiently.

The described whirl method of circulating the air past the nozzle zone and thus repeatedly bringing the air up to and through the finely atomized fuel oil spray insures rapid and intimate mixing of the air and oil and allows substantially all of the highly compressed air confined within the chamber 13 to be properly carburetted with atomized fuel oil. The lack of intimate mixing of the injected fuel oil with its necessary quota of air required for complete combustion and also the lack of uniform distribution of atomized fuel throughout the available air charge, seriously curtail the power capacity of a solid injection oil engine. Under such conditions, all of the available air is not brought to the support of the combustion of the injected fuel oil and in addition the retarded rate of combustion of the resulting imperfect oil-gas mixture materially restricts the allowable piston speed at which such an engine may be economically run.

By virtue of the turbulence imparted to the working charge by the specified whirling action, the available air is made capable of burning the maximum possible amount of fuel oil at an accelerated rate of combustion, and the construction features that admit of this result constitute an important feature of this invention.

The relatively flat cylindrical or drum-like contour given to the combustion chamber not only facilitates the described whirl action but its flattened side walls crowd the air into the nozzle zone and confine the whirling air charge within the lateral range of the spray nozzle flare.

While this engine is intended to work at compression sufficiently high to ignite the injected fuel oil without the need of auxiliary ignition devices, an electrically heated coil 17 or the like may be readily employed for ignition purposes should it be desired to start or operate at a lower compression.

It will be apparent that the intake valve 9 may, if desired, be set directly opposite the exhaust valve and their axes made to align as shown in Fig. 2. However, in the construction shown in Figs. 1 and 3, the confined hot burnt gases remaining in the vaporizer chamber 13 from the previous stroke, can be better utilized to mix with and preheat the fresh incoming air charge as it is being pressed into said chamber, and so induce self-ignition of the injected fuel at a lower compression pressure.

The atomized fuel oil leaving the spray nozzle is further protected from contact with the cold cylinder walls by means of the buffer lug 18, against which the nozzle is directed. As shown in Fig. 4, this cap is set to align with the bore end of the neck-like conduit 14, and is preferably made of nichrome or a similar heat-resisting material. Being made relatively heavy and partially insulated from the cooled head wall by mica washers $18^a$, or the like, this cap is purposely kept at a relatively high temperature so as to act in the capacity of a small hot plate to vaporize any unatomized particles of fuel oil that may lodge against its bevel face. This face further serves to direct such surplus oil down against the hot piston top and aims to prevent the atomized oil from being thrown into direct contact with the cold wall of the cylinder and head.

Assuming now that the power piston has just reached its lower dead center position as shown in the sectional portion of Fig. 3, the inlet valve 9 will have opened to the atmosphere during the immediately preceding stroke and thus allowed the power cylinder to be filled with air as its working charge.

During the next or compression stroke, this air charge will be forced into the vaporizer chamber 13 through the contracted neck-like conduit 14 at a relatively high velocity, which in turn imparts the described whirl movement to the body of air as it is being pressed into the vaporizer chamber.

The air having been carried to a compression sufficiently high to reach the self-ignition temperature of fuel oil by the time the piston approaches its dead center position, the fuel pump 16 opens its discharge valve and allows a measured charge of high-pressure oil to be injected into the cylinder through the spray nozzle 15. The resulting combustion drives the piston forward and just prior to the completion of the expansion stroke, the exhaust valve 5 is opened to allow the burnt products to escape into the atmosphere. The rising piston thereupon expels the hot gases from the bore portion of the power cylinder during the following exhaust stroke but upon closing of the exhaust valve, the combustion chamber 13 will still be left filled with hot burnt gases, which may be later utilized to preheat the next succeeding working charge.

As previously pointed out, the axis of the conduit 14 is offset with respect to that of the cylinder bore, whereby the sudden rise of pressure created within the vaporizer chamber 13 during the combustion period is made to project the ignited mixture into the surplus air lying above the piston and outside of the vaporizer volume proper. The resulting high discharge velocity through the neck-like conduit causes the hot gases to impinge against the buffer lug 18 and to be deflected downward against the piston top, and since the offset conduit axis is again tangentially disposed into a nozzle, the gases furthermore impart an intensified turbulence expanding whirl to the air charge lying over the receding piston, all of which aids in bringing a considerable portion of the air external to the vaporizer chamber to the support of combustion of the injected fuel oil. The fact that the fuel nozzle is directed toward the cylinder bore also serves to increase its effective spread range and aids in evenly distributing the oil throughout all parts of the available air charge. In addition, the intensified whirl imparted to the expanding working fluid serves to pick up and mix with such liquid particles as may have been projected against the hot piston.

It will be seen that by means of my invention sufficient turbulence is provided to thoroughly and rapidly mix the atomized fuel oil with practically all the available air confined within the cylinder walls as required for efficient smokeless combustion. This condition is especially essential in the case of a solid injection engine, since such engines require a considerably larger excess over the air theoretically necessary for complete combustion than does a gas or gasoline engine. It will be further observed that by means of my improved construction I am able to attain a quick burning explosive mixture under the direct control of a timed high pressure fuel pump and am able to make the available air charge support the maximum possible amount of injected fuel oil.

While the preferred embodiments of my invention have been described in detail, it will be understood that I do not wish to be limited to the particular construction here disclosed, since various changes in proportion and arrangement may be resorted to without departing from the spirit and scope of the present invention.

As an instance of such modification, reference is had to Figs. 5 and 6 which show the characteristic whirl feature of my invention applied to a vaporizer oil engine of the two-stroke type in which the intake and exhaust ports are piston controlled. The power piston 2ª which reciprocates in the usual manner within the power cylinder 1ª; is preferably made to travel close up to the head wall so as to force the maximum portion of air into the vaporizer or combustion chamber 13ª.

Instead of the flat-ended drum-shaped vaporizer chamber 13 illustrated in Figs. 3 and 4, the vaporizer 13ª as applied to a two-stroke engine is preferably formed into a bulb-like shape provided with flattened end faces as shown in Fig. 6. These flattened faces crowd the whirling air toward the zone of the spray nozzle and better serve properly to carburize all of the air contained in the vaporizer with atomized fuel oil. For constructive reasons, the axis of the two-stroke vaporizer bulb 13ª is best set to coincide with that of the cylinder, while the neck-like tangential conduit 14ª is offset to impart the characteristic turbulence whirl to the working charge as it is being pressed into the vaporizer chamber.

It will also be observed that the contracted neck 14ª heads directly downward towards the flat crown of the power piston. In this case, the sudden rise of explosive pressure created within the vaporizer projects the ignited oil-gas mixture directly against the hot piston crown whereby the surplus oil is again made to pick up a substantial portion of the air lying outside of the vaporizer chamber proper.

As before, an important feature of the present invention lies in the disposition of the spray nozzle 15ª which is preferably set to align with the vaporizer neck axis and again made to inject the oil across the chamber 13ª toward the piston top and in a counterwise direction to the whirl current imparted to the vaporizer air.

In this case, however, it is unnecessary to provide for a beveled nozzle lug 18 as used in the four-stroke engine, since in the two-stroke engine the nozzle is headed directly against the hot piston top.

In Fig. 5 the vaporizer bulb 13ª is shown provided with an unjacketed cap 19ª, which is intended to raise the average temperature within this chamber. However, when working with a sufficiently high compression, this portion of the vaporizer chamber may be entirely water jacketed when so preferred.

Having thus set forth my invention, I claim as new and desire to secure Letters Patent:

1. In an internal combustion engine provided with a liquid fuel injecting means of the airless type and comprising a cylinder, a separate drum-shaped combustion chamber communicating with the cylinder bore through a contracted neck-like conduit, and a piston adapted to press a charge of air into the combustion chamber, said interposed conduit serving as a tangentially disposed nozzle to impart a turbulence whirl to said entering air charge, and a nozzle directed against said piston and served from said means for injecting fuel into such whirling current.

2. In an internal combustion engine provided with a liquid fuel injecting means of the airless type and comprising a cylinder, a separate combustion chamber of circular contour communicating with the cylinder bore through an open contracted neck-like conduit, a piston adapted to press a charge of air into the combustion chamber, said interposed conduit being offset with respect to the chamber axis and serving as a tangentially disposed nozzle to impart a turbulence whirl movement to said air charge, and a nozzle directed into the mouth of said conduit adapted to inject fuel chord-wise across said chamber through said air charge.

3. In an internal combustion engine comprising a cylinder, a separate combustion chamber of circular contour communicating with the cylinder bore through an open neck-like conduit, and a piston adapted to press a charge of air into the combustion chamber, said interposed conduit being offset with respect to the chamber axis and serving as a tangentially disposed nozzle to impart a turbulence whirl movement to said air charge, and a fuel nozzle injecting fuel chord-wise across said chamber and through said conduit against the crown of the piston.

4. In a liquid fuel engine provided with a fuel injecting means and comprising a cylinder, a separate combustion chamber of circular contour communicating with the cylinder bore through a contracted neck-like conduit, means for charging the cylinder with air, a piston adapted to press a major portion of such air into the combustion chamber, said interposed conduit being tangentially disposed with respect to both the axis of the cylinder and the axis of said chamber, and serving in the first instance to impart a turbulence whirl while said air is being pressed into said chamber, and serving subsequent to the injection of the liquid fuel to cause the expanding gases to impart a turbulence whirl movement about the cylinder axis to that portion of air remaining within the cylinder bore, and a nozzle directed into said conduit and adapted to inject fuel against the crown of said piston.

5. In a four-stroke liquid fuel engine provided with a fuel injecting means of the airless type and comprising a L head cylinder having intake and exhaust valves, a separate drum-shaped combustion chamber offset from the cylinder axis and communicating with the cylinder bore through an open neck-like conduit and having one or both of said valves opening into the flat side or sides of said chamber, a piston adapted to press a charge of air into the combustion chamber, said interposed conduit serving as a tangentially disposed nozzle to impart a turbulence whirl to said air charge prior to the fuel injection period.

6. In a four-stroke liquid fuel engine of the airless direct-injection type comprising a L head cylinder having an intake and an exhaust valve, a separate drum-shaped combustion chamber offset from the cylinder axis and communicating with the cylinder bore through an open neck-like conduit and having either or both of said valves opening into the flat side or sides of said chamber, a piston adapted to press a charge of air into the combustion chamber, said interposed conduit serving as a tangentially disposed nozzle to impart a turbulence whirl to said air charge, and a spray nozzle for injecting fuel into said air charge.

7. In a four-stroke liquid fuel engine of the airless direct-injection type comprising a L head cylinder provided with an exhaust valve, a separate drum-shaped combustion chamber communicating with the cylinder bore through an open neck-like conduit and having said valve opening into one of the flat sides of said chamber, a piston adapted to press a charge of air into the combustion chamber, said interposed conduit serving as a tangentially disposed nozzle to impart a turbulence whirl to said air charge, and a fuel nozzle injecting fuel in a direction parallel to the face of said exhaust valve and through said open conduit toward the piston crown.

8. In a four-stroke liquid fuel engine comprising a cylinder having intake and exhaust valves, a separate drum-shaped combustion chamber offset from the cylinder axis, and communicating with the cylinder bore through an open neck-like conduit and having either or both of said valves opening into the flat side or sides of said chamber, a piston adapted to press a charge of air into the combustion chamber, said interposed conduit serving as a tangentially disposed nozzle to impart a turbulence whirl to said air charge, a fuel nozzle injecting fuel toward said open conduit, and a beveled baffle lug disposed at the bore end of said conduit serving to divert said fuel toward the piston for the purpose specified.

9. In a four-stroke liquid fuel engine comprising a cylinder having inlet and exhaust valves, a separate drum-shaped combustion chamber communicating with the cylinder bore through an open neck-like conduit means and having said valves disposed to open into opposite sides of the flat chamber walls, a piston adapted to press a charge of air into the combustion chamber, said interposed conduit serving as a tangentially disposed nozzle to impart a turbulence whirl to said air charge, and a fuel nozzle disposed between said opposite valves for injecting fuel oil across said chamber and through said conduit against the crown of the piston.

10. In a four-stroke liquid fuel engine provided with a fuel injecting means and comprising a cylinder of the L head type having inlet and exhaust valves, the latter seating in an offset portion of the cylinder casting, a detachable cylinder head in which is formed a drum-shaped combustion chamber encircling said exhaust valve and communicating with the cylinder bore through an open contracted neck-like conduit, a piston adapted to press a charge of air into the combustion chamber, said interposed conduit serving to impart a turbulence whirl to the air whereby said air is repeatedly made to pass through the nozzle zone at the time of fuel injection.

11. In a liquid fuel engine of the class described comprising a cylinder and a fuel injecting means of the airless type, a separate relatively flat cylindrically shaped combustion chamber communicating with the cylinder bore through a contracted neck-like conduit means, a reciprocating piston adapted to press a charge of air into the combustion chamber, a spray nozzle injecting fuel oil through chord-wise across said chamber and said air charge against the piston, said interposed conduit means serving to impart a turbulence whirl to the air charge whereby said air charge is repeatedly made to pass through the nozzle zone during the time of fuel injection.

12. In an internal combustion engine comprising a cylinder, a separate combustion chamber communicating with the cylinder bore through a conduit tangentially disposed with respect to the cylinder bore, means for charging said cylinder with working fluid, a reciprocating piston adapted to press the major portion of said fluid into the combustion chamber, means for producing combustion within said chamber, means forming said interposed conduit into a nozzle adapted to intensify a turbulence whirl movement about the cylinder axis while such expanding fluid re-enters said cylinder.

13. In a liquid fuel engine of the airless direct-injection type comprising a cylinder and a reciprocating piston therefor adapted to give mobility to a charge of working fluid, a separate combustion chamber communicating with said cylinder through an open contracted neck-like conduit, said interposed conduit being tangentially disposed and adapted to intensify a turbulence whirl movement within said fluid resulting from piston displacement, a nozzle injecting liquid fuel across said chamber and against said piston, and a fuel injecting means serving said nozzle adapted to atomize the injected liquid fuel without the use of an air blast.

14. In a liquid fuel engine of the airless direct-injection type comprising a cylinder and a reciprocating piston adapted to give mobility to the working fluid, a combustion chamber of circular contour communicating with the cylinder through a contracted conduit tangentially disposed with respect to both the cylinder and said chamber, said interposed conduit serving to intensify a turbulence whirl movement within the working fluid in either direction of flow for the purpose of distributing the liquid fuel therein, and a fuel nozzle adapted to inject through said conduit and against the piston.

In testimony whereof I have hereunto set my hand this 18th day of July, 1921.

LOUIS ILLMER.

Witnesses:
 G. HARRY CASE,
 HARRY R. SMITH.

provided with a fuel injecting means and comprising a cylinder of the L head type having inlet and exhaust valves, the latter seating in an offset portion of the cylinder casting, a detachable cylinder head in which is formed a drum-shaped combustion chamber encircling said exhaust valve and communicating with the cylinder bore through an open contracted neck-like conduit, a piston adapted to press a charge of air into the combustion chamber, said interposed conduit serving to impart a turbulence whirl to the air whereby said air is repeatedly made to pass through the nozzle zone at the time of fuel injection.

11. In a liquid fuel engine of the class described comprising a cylinder and a fuel injecting means of the airless type, a separate relatively flat cylindrically shaped combustion chamber communicating with the cylinder bore through a contracted neck-like conduit means, a reciprocating piston adapted to press a charge of air into the combustion chamber, a spray nozzle injecting fuel oil through chord-wise across said chamber and said air charge against the piston, said interposed conduit means serving to impart a turbulence whirl to the air charge whereby said air charge is repeatedly made to pass through the nozzle zone during the time of fuel injection.

12. In an internal combustion engine comprising a cylinder, a separate combustion chamber communicating with the cylinder bore through a conduit tangentially disposed with respect to the cylinder bore, means for charging said cylinder with working fluid, a reciprocating piston adapted to press the major portion of said fluid into the combustion chamber, means for producing combustion within said chamber, means forming said interposed conduit into a nozzle adapted to intensify a turbulence whirl movement about the cylinder axis while such expanding fluid reenters said cylinder.

13. In a liquid fuel engine of the airless direct-injection type comprising a cylinder and a reciprocating piston therefor adapted to give mobility to a charge of working fluid, a separate combustion chamber communicating with said cylinder through an open contracted neck-like conduit, said interposed conduit being tangentially disposed and adapted to intensify a turbulence whirl movement within said fluid resulting from piston displacement, a nozzle injecting liquid fuel across said chamber and against said piston, and a fuel injecting means serving said nozzle adapted to atomize the injected liquid fuel without the use of an air blast.

14. In a liquid fuel engine of the airless direct-injection type comprising a cylinder and a reciprocating piston adapted to give mobility to the working fluid, a combustion chamber of circular contour communicating with the cylinder through a contracted conduit tangentially disposed with respect to both the cylinder and said chamber, said interposed conduit serving to intensify a turbulence whirl movement within the working fluid in either direction of flow for the purpose of distributing the liquid fuel therein, and a fuel nozzle adapted to inject through said conduit and against the piston.

In testimony whereof I have hereunto set my hand this 18th day of July, 1921.

LOUIS ILLMER.

Witnesses:
G. HARRY CASE,
HARRY R. SMITH.

Certificate of Correction.

It is hereby certified that in Letters Patent No. 1,531,399, granted March 31, 1925, upon the application of Louis Illmer, of Cortland, New York, for an improvement in "Internal-Combustion Engines," an error appears in the printed specification requiring correction as follows: Page 6, line 25, claim 11, strike out the word "through" and insert the same before the word "said", line 26, same claim; and that the said Letters Patent should be read with this correction therein that the same may conform to the record of the case in the Patent Office.

Signed and sealed this 2d day of June, A. D. 1925.

[SEAL.]

KARL FENNING,
*Acting Commissioner of Patents.*

Certificate of Correction.

It is hereby certified that in Letters Patent No. 1,531,399, granted March 31, 1925, upon the application of Louis Illmer, of Cortland, New York, for an improvement in "Internal-Combustion Engines," an error appears in the printed specification requiring correction as follows: Page 6, line 25, claim 11, strike out the word "through" and insert the same before the word "said", line 26, same claim; and that the said Letters Patent should be read with this correction therein that the same may conform to the record of the case in the Patent Office.

Signed and sealed this 2d day of June, A. D. 1925.

[SEAL.]

KARL FENNING,
*Acting Commissioner of Patents.*